United States Patent
Bashetty et al.

(10) Patent No.: US 11,930,054 B2
(45) Date of Patent: Mar. 12, 2024

(54) HOLISTIC USER ENGAGEMENT ACROSS MULTIPLE COMMUNICATION CHANNELS

(71) Applicant: American Express Travel Related Services Company, Inc., New York, NY (US)

(72) Inventors: Anil Kumar Bashetty, Plainsboro, NJ (US); Swetha Gayam, Piscataway, NJ (US); Mark E. Johnson, Bountiful, UT (US); Deepak Kumar, Jersey City, NJ (US); Mazhar Ladji, Brooklyn, NY (US); Cong Liu, New York, NJ (US); Zeyu Liu, Jersey City, NJ (US); David Keith Love, Tucson, AZ (US); Amarnath E. Mahendran, Basking Ridge, NJ (US); Matthew K. Meyer, Livingston, NJ (US); Emery Schoenly, Salisbury, CT (US); Jeremy D. Seideman, Brooklyn, NY (US); Govind Sharma, Iselin, NJ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 17/588,505

(22) Filed: Jan. 31, 2022

(65) Prior Publication Data
US 2023/0247070 A1 Aug. 3, 2023

(51) Int. Cl.
*H04L 65/403* (2022.01)

(52) U.S. Cl.
CPC ............... *H04L 65/403* (2013.01)

(58) Field of Classification Search
CPC ... H04L 65/403; G06Q 30/016; H04M 3/5175
USPC .................................................. 709/206
See application file for complete search history.

(56) References Cited

U.S. PATENT DOCUMENTS

| | | | |
|---|---|---|---|
| 2002/0083067 A1* | 6/2002 | Tamayo | G06F 16/951 |
| 2004/0044659 A1* | 3/2004 | Judd | G06F 16/81 |
| 2012/0054627 A1* | 3/2012 | Priyadarshan | G06Q 30/0251 |
| | | | 715/738 |
| 2020/0193447 A1* | 6/2020 | Jaiswal | H04M 3/5191 |
| 2021/0256207 A1* | 8/2021 | Dunn | G06F 40/205 |

\* cited by examiner

*Primary Examiner* — Zi Ye
(74) *Attorney, Agent, or Firm* — Thomas | Horstemeyer, LLP

(57) ABSTRACT

Disclosed are various embodiments facilitating a holistic engagement with a user across multiple communication channels of an organization or an enterprise based at least in part on a determined user intent. As users interact with various services associated with the organization through one or more communication channels, interaction data can be captured and stored. In various examples, the interaction data that is stored by the various services can be obtained and organized according to a predefined schema. The organized interaction data can be applied to a trained intent model that outputs a user intent based at least in part on observations of other users with similar histories. The predicted intent can be provided to the different services such that subsequent interactions between the user and the organization can be based at least in part on the intent in a consistent manner, regardless of the communication channel associated with the interaction.

20 Claims, 5 Drawing Sheets

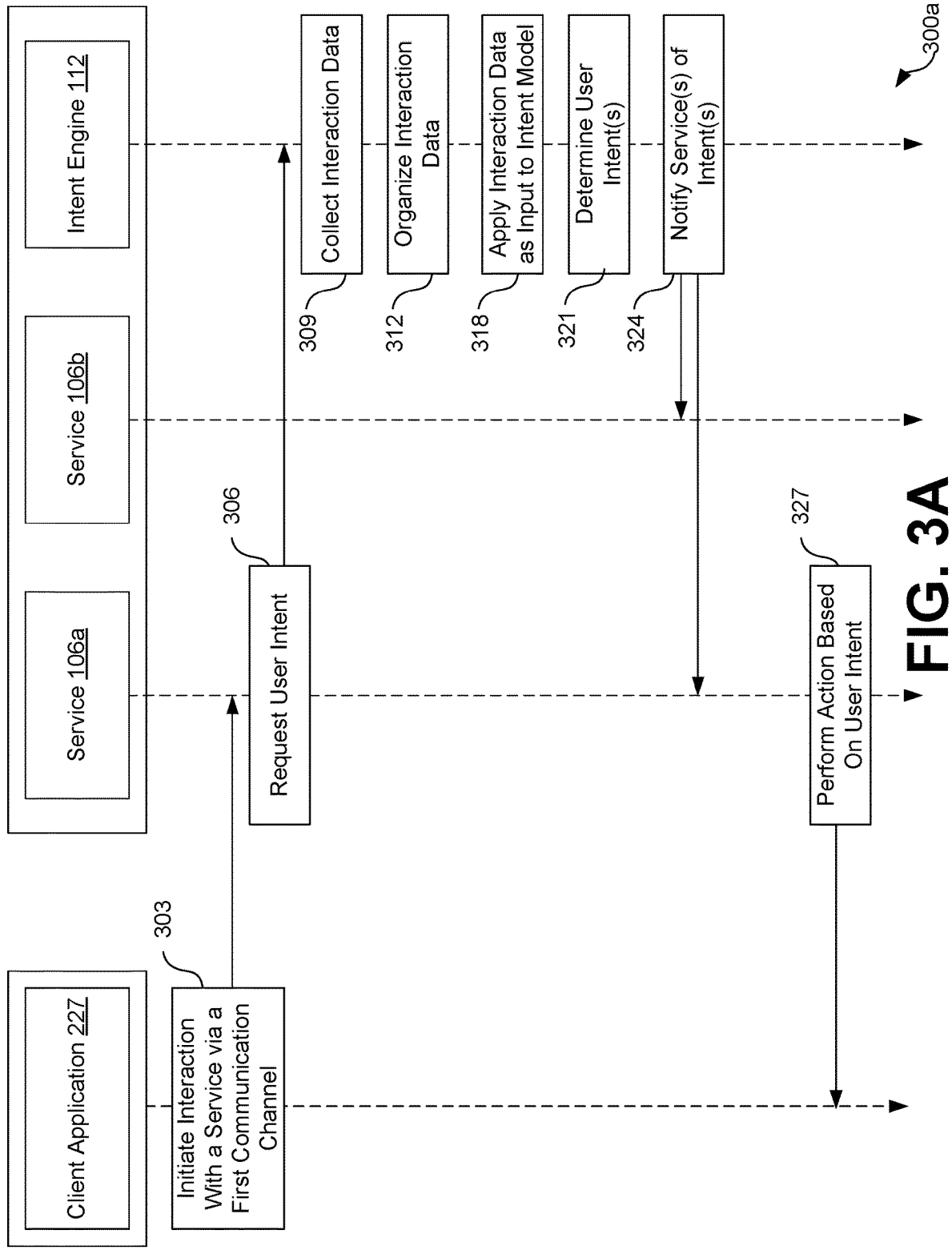

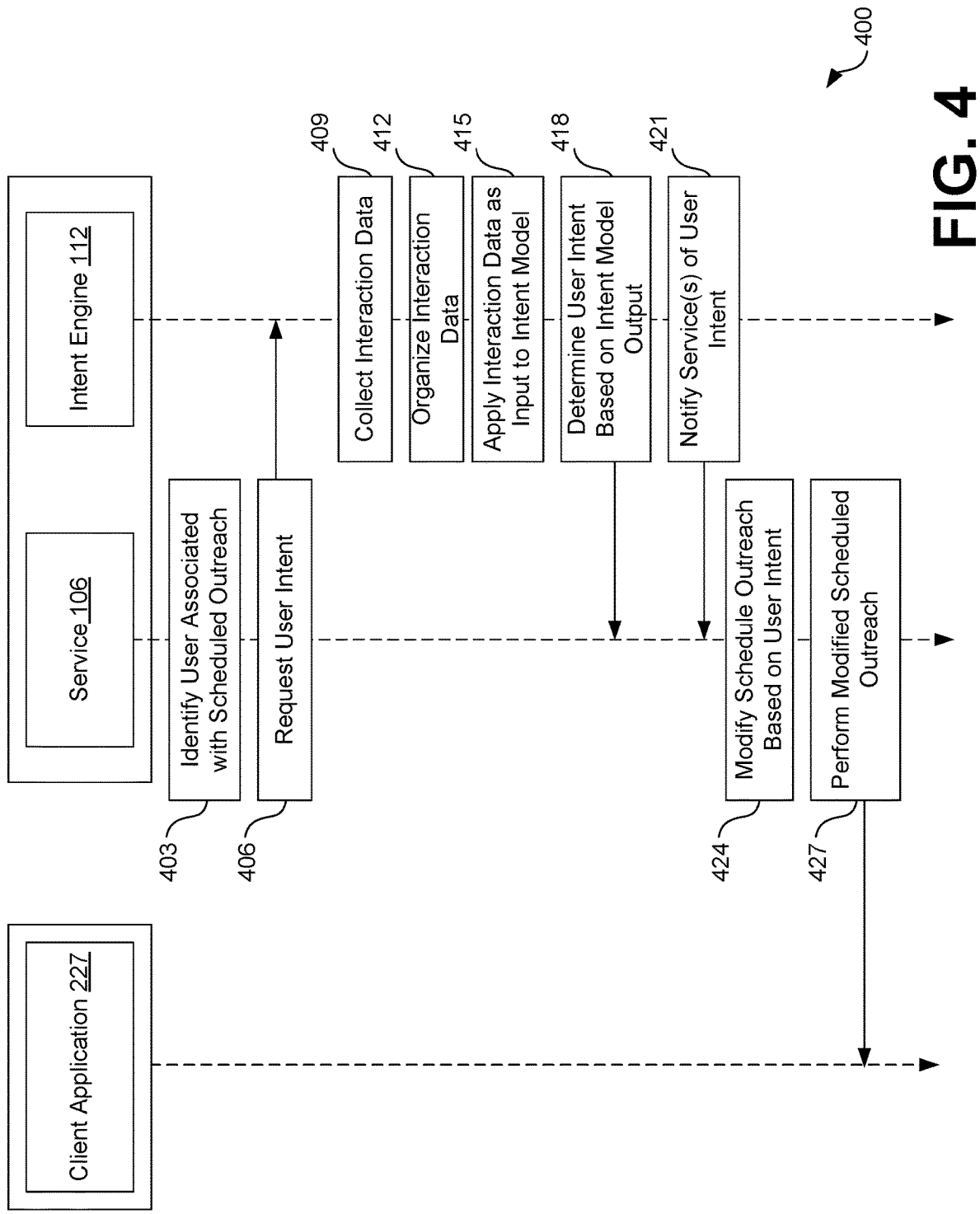

HOLISTIC USER ENGAGEMENT ACROSS MULTIPLE COMMUNICATION CHANNELS

BACKGROUND

Organizations use many different communication channels (e.g., phone, email, chat, direct mail, webpage, etc.) to engage with customers. Messaging across different channels can be inconsistent, with channels unable to coordinate or change their messaging based at least in part on feedback and other actions taken by individual customers. An example of this is when a customer attempting to resolve a specific issue or complaint over one communication channel (e.g., chat) must repeat or reenter their information when switching to a different channel (e.g., phone). Accordingly, the customer can become frustrated with the inconsistent messaging coming from the organization.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 3A, 3B, and 4 are sequence diagrams illustrating examples of functionality in the network environment of FIG. 2 according to various embodiments of the present disclosure.

DETAILED DESCRIPTION

Disclosed are various approaches for facilitating holistic engagement with a user across multiple communication channels of an organization or an enterprise based at least in part on a determined user intent. As users interact with various services associated with the organization or enterprise through one or more communication channels (e.g., web, phone, email, text, chat, payment system, etc.), interaction data can be captured, verified, and stored in batch and/or real-time data stores. In various examples, the interaction data that is stored by the various services can be obtained and organized according to a predefined schema. The organized interaction data can be applied to a trained intent model that recognizes a user intent based at least in part on observations of other users with similar histories. In various examples, the output of the trained intent model provides one or more likely user intents which is then provided to each service in the organization. Accordingly, subsequent interactions with the user can be based at least in part on the determined intent in a consistent and focused manner, regardless of the communication channel or service associated with the interaction.

According to various examples, the present disclosure leverages proprietary real-time and batch closed-loop data from previous user engagements and communications, across all available channels, to intelligently predict the current state, needs, and intent of the user. These intent predictions, and supporting data, are then made available to all user-facing systems in real-time. Accordingly, the present disclosure facilitates consistent user messaging across all communication channels and increases customer satisfaction via a holistic, organization-wide engagement experience across all communication channels. The system of the present disclosure anticipates likely user needs and allows our organization to respond to those needs as one entity, regardless of the communication channels used.

Figure 1:
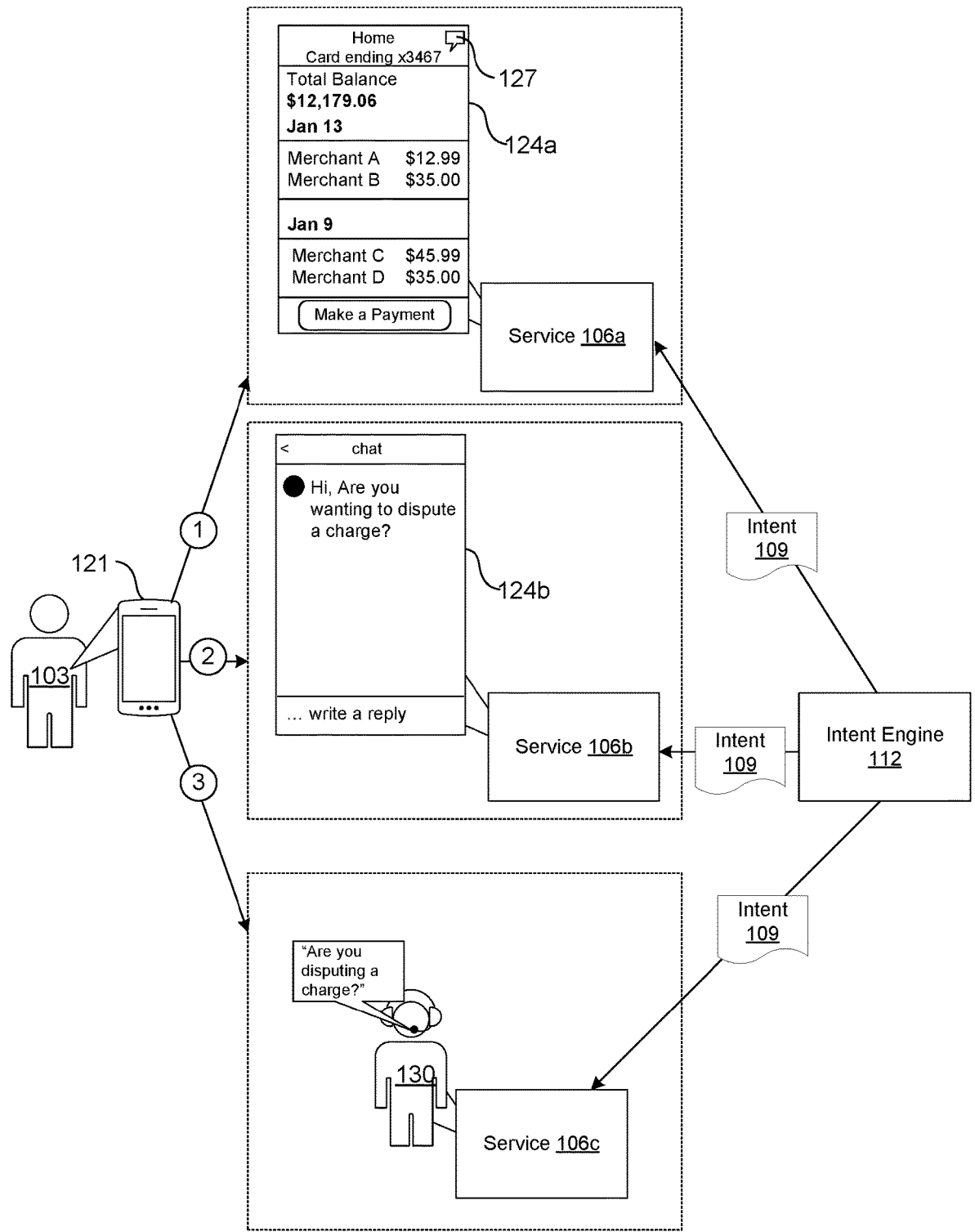
FIG. 1 is a drawing depicting one of several embodiments of the present disclosure.

Turning now to FIG. 1, shown is a drawing depicting an example scenario in which a user 103 interacts with various services 106 (e.g., 106a, 106b, 106c) associated with an organization or enterprise. In various examples, users 103 can initiate interactions with different services 106 associated with the organization based at least in part on what a given service 106 can provide to the user 103. In other examples, the different services 106 can initiate engagement with a user in order to notify the user 103 of information associated with the organization and/or the user 103. In various examples, user interactions with the different services 106 can be conducted over different types of communication channels (e.g., phone, web, text, email, direct mail, etc.). For example, the services 106 illustrated in FIG. 1 correspond to a web service, a chat service, and a phone service. However, the services 106 can include a web service, a chat service, a phone service, an email service, a text service, a mail service, or other type of service.

Figure 2:
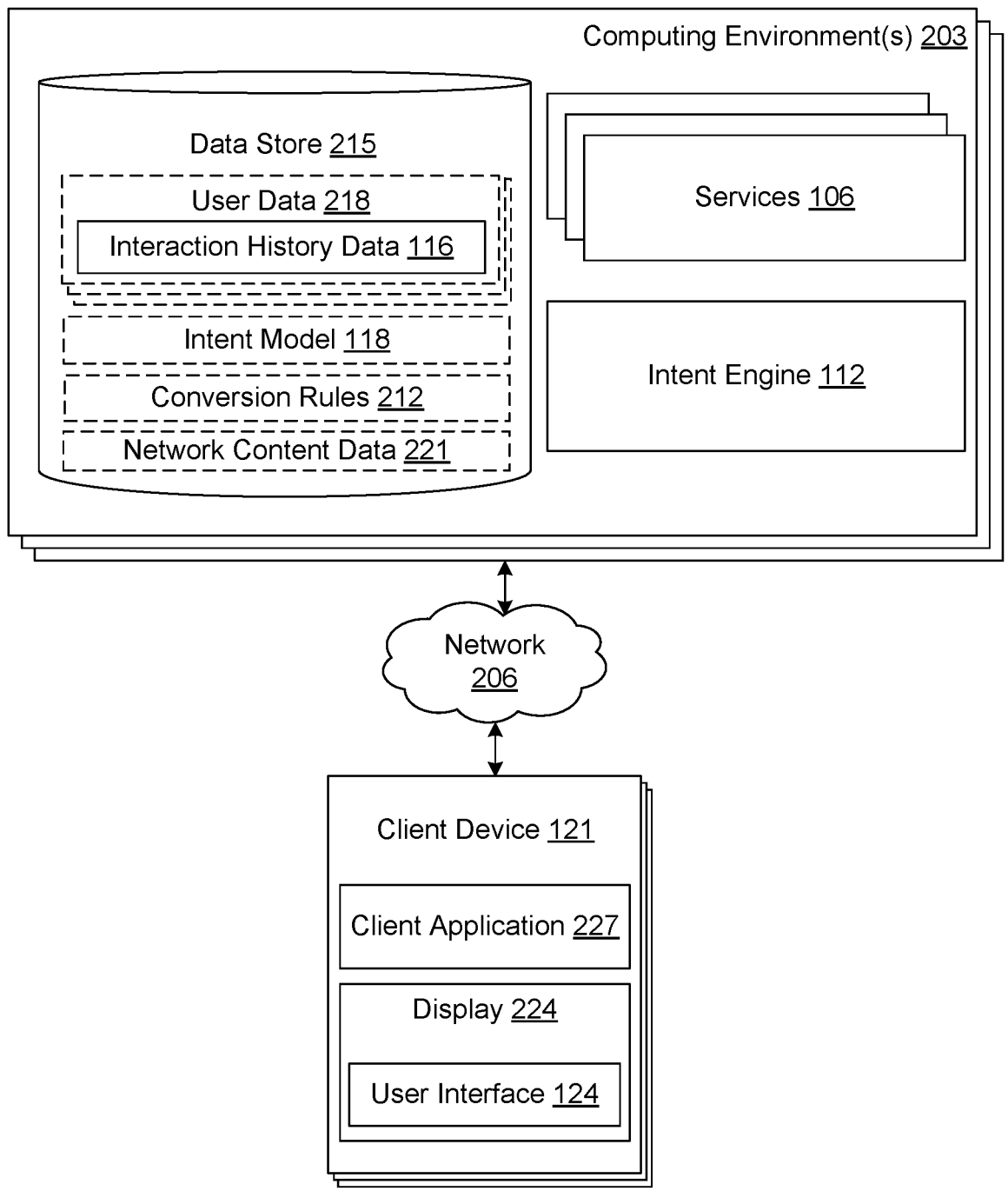
FIG. 2 is a drawing of a network environment according to various embodiments of the present disclosure.

According to various examples of the present disclosure, the services 106 can provide consistent messaging and interaction with the user 103 based at least in part on an understanding of a user intent 109 that is determined by an intent engine 112 and distributed to all of the services 106. The intent engine 112 of the present disclosure is configured to collect and organize interaction history data 116 (FIG. 2) associated with the user 103 and apply the interaction history data 116 to a trained intent model 118 (FIG. 2). In various examples, an output of the trained intent model 118 can include a prediction of one or more likely user intents 109 associated with the given user based at least in part on an analysis of the interaction history data 116. Upon determining a user intent 109, the intent engine 112 can transmit the user intent 109 to each associated service 106 so that each service 106 is aware of a user's predicted intent or state.

Each of the services 106 associated with an organization or enterprise can be configured to allow a user 103 to obtain information and/or access data associated with the organization. For example, the organization associated with the services 106 of FIG. 1 can correspond to a credit card company that has issued a payment account to the user 103. In this example, the user 103 can interact with a first service 106a to review transaction history and make payments associated with his or her payment account. Similarly, the user 103 can interact with a second service 106b or a third service 106c with regard to questions about his or her payment account.

In the example of FIG. 1, the user 103 initiates an interactive session with a first service 106a via a client device 121 to review account information associated with his or her account. In various examples, the first service 106a can generate and provide a user interface 124a that can be rendered on the client device 121. The user interface 124a of FIG. 1 that is provided by the first service 106a and rendered on the client device 121 includes transaction data associated with payment transaction using a payment instrument provided by the organization. In various examples, the user 103 can interact with the user interface 124 to review transaction data and details associated with the user's transaction history.

According to various examples, interaction history data 116 (e.g., clicks, hovers, time spent reviewing a webpage, etc.) associated with the interaction session can be captured, verified, and stored for both batch and/or real-time consumption. For example, the first service 106a can capture data associated with any interaction by the user with the first service 106a and store the interaction history data 116 in batch data stores and/or real-time data stores. For batch consumption, the interaction history data 116 can be included in a streaming system of records captured by the first service 106a and stored in a batch data store. Similarly, for real-time consumption, the interaction history data 116 can be streamed in real-time and stored in a low-latency cache where it can be accessed in real-time or near real-time by other services 106 via application programming interface (API) calls. In some examples, the interaction history data 116 is stored in one or more data stores associated with a given service 106. In other examples, the interaction history data 116 is stored in one or more data stores associated with the organization or enterprise. In this example, the interaction history data 116 collected from multiple services 106 can be stored in one or more centralized data stores.

In the example of FIG. 1, assume that the user 103 has become concerned about a particular transaction charge during his or her interactive session with the first service 106a and that the user 103 is unable to obtain the information needed to resolve the issue via his or her interactions with the first service 106a. For example, the user 103 may wish to dispute a transaction charge and is unsure how to dispute the charge via interactions with the user interface 124. As such, the user 103 can initiate an interaction with the second service 106b to try and obtain the information from the second service 106b. In the example of FIG. 1, the second service 106b corresponds to a chat service which allows the user to engage in a chat communication (e.g., automated chat, human chat, etc.) with the organization. In some examples, the user 103 can initiate the interaction with the second service 106b via a selection of the chat component 127 included in user interface 124a.

According to various examples, upon receiving a request to initiate an interactive session with the second service 106b by the user 103 via the client device 121, the second service 106b can identify the user 103 and contact the intent engine 112 using an application programming interface (API) call in order to request a user intent associated with the user 103 requesting the interactive session with the second service 106b.

According to various examples, upon receiving a request for a user intent 109 from the second service 106, the intent engine 112 can collect interaction history data 116 from the different services 106 of the organization, including the interaction history data 116 collected by the first service 106a during the user's interaction with the first service 106a. Upon collecting the interaction data, the intent engine 112 can organize the interaction data according to a predefined schema. In some examples, the intent engine 112 can translate interaction history data 116 that is in a first type of format into a second type of format that is required to comply with a format associated with a predefined schema. For example, data collected from a phone call may be stored in a first type of format, but must be translated into a different type of format to be understood by the intent model 118. In various examples, the intent engine 112 can apply one or more data conversion libraries or programs to translate the data from a first type of format into a second type of format.

Upon collecting and organizing the interaction history data 116, the intent engine 112 can apply the organized interaction history data 116 as one or more inputs into the intent model 118 which is trained to recognize a user intent 109 based at least in part on observations of other users with similar histories. The output of the intent model 118 can include one or more predicted user intents 109, and the intent engine 112 can provide the predicted user intents 109 to the different services 106 to allow the messaging and interactions with a given user 103 to be consistent across all services 106 and communication channels.

Accordingly, in the example of FIG. 1, the service 106b can generate a chat user interface 124b that includes an indication of the user's intent based at least in part on prior interaction history data 116. Based on at least the user's interactions with the first service 106a, the intent engine 112 can predict that the user is concerned about a particular transaction charge. As such, the second service 106b can generate the content of a chat user interface 124b to include an indication that the second service 106b is aware of why the user 103 is engaging with the second service 106b without the user 103 having to explain his or her reasoning for interacting with the second service 106b. As the user 103 interacts with the second service 106b, the second service 106b collects and stores the interaction history data 116 associated with the user's interaction for batch and real-time consumption. For example, the interaction history data 116 can include questions and/or comments that the user 103 entered to engage in with the chat conversation.

Similarly, if the second service 106b is unable to help the user 103 with his or her issue, the user 103 may choose to engage with a third service 106c. In FIG. 1, the third service 106c corresponds to a phone service which allows the user 103 to engage in a telephone conversation with a representative 130. Similarly to the interactive session between the user 103 and the second service 106b, when the user 103 engages in an interactive session with the third service 106c, the third service 106c can send a request to the intent engine 112 to determine why the user 103 is engaging with the third service 106c without the user 103 having to explain.

Based on at least the user's interactions with the first service 106a and the second service 106b, the intent engine 112 is able to predict that the user is concerned about a particular transaction charge. As such, the third service 106c is able to notify the representative 130 of the predicted reason that the user is calling. As shown in FIG. 1, the representative is able to start the call with the user 103 by asking the user 103 if he or she is calling to dispute a charge. As illustrated in the example of FIG. 1, the present disclosure allows an organization to carry out sophisticated exchanges with users 103 across multiple communication channels while consistently acknowledging both the user actions and the expected user intent 109.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 2, shown is a network environment 200 according to various embodiments. The network environment 200 can include a computing environment 203 and a client device 121, which can be in data communication with each other via a network 206. The network 206 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 206 can also include a combination of two or more networks 206. Examples of networks 206 can include the Internet, intranets, extranets, virtual private networks (VPNs), and similar networks.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203. The components executed on the computing environment 203 include services 106, an intent engine 112, and other applications, services, processes, systems, engines, or functionality not discussed in detail herein.

The services 106 can be executed to interact with users 103 associated with client devices 121 to meet the needs of an organization and/or the users 103. According to various examples, different services 106 can be configured to communicate with users 103 or client devices 121 of users 103 across multiple types of communication channels. For example, the services 106 may include a chat service, a web service, an email service, a direct mail service, a telephone service, and/or other type of service that can engage or otherwise interact with a user 103 to meet the needs of the organization and/or user 103. The different types of communication channels can include phone calls, video conferencing, emails, text messaging, online messaging (e.g., chat), social media messaging, direct mail, or other types of communication channels. According to various examples, a service 106 can be executed to initiate and/or engage with a user 103 with respect to the needs of the given organization.

According to various examples, the services 106 are configured to capture, verify, and store any interaction history data 116 associated with a given interaction with a user. For example, a chat service 106 can capture any chats exchanged between the user and the chat service 106 or chat service representative. In addition, the chat service 106 can capture time logs associated with the chat exchange. In another example, a web service 106 can be configured to generate and provide user interfaces 124 comprising content associated with the organization and/or user 103. In the example of a credit card organization, the content may include payment account data, transaction account data, payment instrument offerings, and/or other type of data. As a user 103 interacts with the content provided via the user interface(s) 124, the web service 106 can capture the interaction history data 116 (e.g., clicks, hovers, etc.) associated with the user's 103 interaction with the content.

In various examples, the services 106 are executed to store the captured interaction history data 116 in a data store. The captured interaction history data 116 can be stored in at least one of a batch data store or a real-time data store to allow the interaction history data 116 to be accessible in batch and/or real-time consumption. In various examples, the interaction history data 116 is stored in association with the given service 106. In other examples, the interaction history data 116 that is captured is stored in association with one or more centralized data stores associated with the organization or enterprise.

In various examples, a service 106 can be executed to send a request to the intent engine 112 to determine one or more likely user intents 109 or user states. This request can be sent in response to a user 103 initiating interaction with the service 106 or in response to the service 106 wanting to initiate an interaction with the user 103. In various examples, the request to the intent engine 112 is in the form of an API request. In various examples, the request includes a user identifier to allow the intent engine 112 the ability to identify the user 103 or user account associated with the intent request. The intent engine 112 returns one or more likely user intents 109 associated with the user 103 based at least in part on an analysis of interaction history data 116 of the user. In various examples, the intent engine 112 applies the interaction history data 116 to a trained intent model that recognizes one or more user intents 109 based at least in part on observations of other users 103 with similar histories. In various examples, the intent engine 112 returns an identification of at least one user intent 109. In some examples, the intent engine 112 returns a ranked listing of user intents 109, where the user intents 109 are ranked according to a likelihood that the predicted user intent 109 is an actual user intent.

In various examples, the service 106 can determine a message to present to the user 103 in response to the one or more user intents 109 provided from the intent engine 112. For example, a chat service 106 may determine to start a chat session with a user 103 by generating a chat user interface 124 with a question directed based at least in part on the user intent 109. As illustrated in the example of FIG. 1, the user intent 109 may indicate that the user 103 is initiating contact with the service 106 because the user 103 wants to dispute a charge. As such, the service 106 can generate a user interface 124 that includes an inquiry into whether the user 103 is wanting to dispute a charge. In some examples, the service 106 can determine the message based at least in part on a predefined listing of messages that correspond to intents 109 that can be generated by the intent model 118. The service 106 can cause the user interface 124 to be rendered on the client device 121. In one or more examples, the service 106 can transmit user interface code that is executable by the client device 121 to generate and render the user interface 124 on the client device 121. In other examples, service 106 can transmit the generated user interface 124 to the client device 121 for rendering.

In some examples, a service 106 can determine a user state based at least in part on a user intent 109 and determine a type of outreach to provide to the user 103. In this example, a service 106 can initiate a communication with a user 103 and can determine a type of outreach to provide to the user 103 based at least in part on the user intent 109 and/or a user state. For example, an email service 106 can have a scheduled outreach for users 103 associated with the organization. The scheduled outreach can include sending a batch of emails to the users 103 that correspond to different features associated with the organization. In some examples, a service 106 can determine that a particular user 103 may not read emails on a particular day of the week based at least in part on the user intent 109. As such, the service 106 can modify the scheduled outreach for the user 103 so that the emails are sent to the user 103 on a different day. In other examples, the scheduled outreach can be modified by removing one or more messages and/or content included in the messages based at least in part on knowledge of a user intent 109 and/or user state.

The intent engine 112 can be executed to determine a user intent 109 associated with a given user 103. In various examples, a service 106 can send a request to the intent engine 112 requesting an identification of one or more user intents 109 associated with a given user 103. In various examples, the request includes an identification of the user 103. The identification can include a user identifier, a payment account number, a client device identifier, and/or other type of identifier that the intent engine 112 can use to identify the user 103.

In various examples, the intent engine 112 can collect interaction history data 116 associated with the identified user. In various examples, the intent engine 112 can collect the interaction history data 116 by sending requests to obtain the user interaction history data 116 corresponding to the different services 106. In various examples, the requests can include API requests to the batch data store(s) and the real-time data store(s) associated with the services 106 that request the interaction history data 116 associated with the user 103. In various examples, the requested interaction history data 116 can include transaction data history, chat interaction history, call interaction history, payment interaction history, web interaction history, and/or other types of interaction data. In various examples, the obtained interaction history data 116 can include data associated with the user over a predefined period of time (e.g., 30 days). In other examples, the obtained interaction history data 116 can be limited by a number of records included in the interaction history data 116. For example, the number of transaction records received may be limited by a predefined number (e.g., up to 20 transactions).

In various examples, the intent engine 112 can analyze the obtained interaction history data 116 and organize the interaction history data 116 into a predefined schema. For example, the predefined schema may define how the data is to be organized based at least in part on the type of data, a format of data, what is included in the data, and/or other factors. In some examples, the intent engine 112 can translate interaction history data 116 from a first type of data format into a second type of data format. For example, the data format for a chat history may differ from the data format for a web interaction. As such, the intent engine 112 can apply the conversion rules 212 to format the chat history data and/or the web interaction data into a consistent format, as defined by the conversion rules 212. In various examples, the interaction history data 116 that is organized in the predefined schema is provided as an input to a trained intent model 118.

In various examples, the intent model 118 comprises a deep neural network model that receives the organized interaction history data 116 associated with a user 103 (e.g., user emails and other messages they have received, recent actions on their account (e.g., transactions they've made, declined transactions, change in credit limit, fraud reports), web-based interactions, and previous interactions with representatives, etc.) as an input. In various examples, this organized interaction history data 116 is provided to the intent model 118 as time series data. The intent model 118 is trained to recognize user intent 109 based at least in part on observations of what other user with similar histories did next or what was done on their behalf.

In various examples, the output of the intent model 118 includes one or more likely user intents 109 associated with the user 103. In various examples, the intent model 118 provides the user intent 109 to the requesting service 106 as well as to the other services 106 associated with the organization or enterprise. As such, the messaging across the different services 106, and communication channels, is consistent.

Also, various data is stored in a data store 215 that is accessible to the computing environment 203. The data store 215 can be representative of a plurality of data stores 215, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 215 is associated with the operation of the various applications or functional entities described below. This data can include user data 218, the intent model 118, conversion rules 212, network content data 221, and potentially other data.

The user data 218 corresponds to information related to users 103 having accounts with the organization or enterprise associated with the computing environment 203. For example, the user data can correspond to information related to individuals who have been issued payment accounts by an issuer associated with the issuer system. A payment account can represent any financial account or agreement that a customer can use as a source of funds for payments. Payment accounts can include both credit accounts or facilities and financial deposit accounts that provide the owner with on demand access to funds stored in or associated with the payment account. In some instances, a payment account can allow a user to have frequent and/or immediate access to funds. In these instances, payment accounts can also be referred to as demand deposit accounts, which can be accessed in a variety of ways, such as the use of debit cards, checks, or electronic transfers (e.g., wire transfer, automated clearing house (ACH) transfer, etc.). Examples of payment accounts include charge or charge card accounts, credit or credit card accounts, checking accounts, savings accounts, money market accounts, demand accounts, deposit accounts, demand deposit accounts, etc.

The user data 218 may include interaction history data 116, account address(es), payment instrument data, authentication information, and/or other data associated with a user 103 or user account. The interaction history data 116 may include information specific to a user account such as, for example, a transaction history (including purchase frequency, purchase cadence, purchase recency, transaction disputes, declined transactions, etc.), a browsing history, a viewing history, a chat history, a messaging history, an account history (e.g., credit limits, fraud reports, etc.), a telephone history, a search history, and/or other information that reflects a prior interaction by the user account with the different services 106 included in the computing environment 203.

The intent model 118 includes, for example, a logistic regression classifier, a random forest classifier, a decision tree classifier, an XGBoost classifier, a multi-layer perceptron classifier, a recurrent neural network, a feed-forward neural network, a label-specific attention network, and/or any other type of trained model as can be appreciated. According to various examples, the intent model 118 is trained interaction history data 116 associated with a plurality of users 103 to learn how to recognize a user intent 109 based at least in part on observations of other users with similar histories. In various examples, the output of the intent model 118 includes one or more likely user intents 109 associated with a given user 103. In some examples, the output incudes a ranked listing of likely user intents 109.

The conversion rules 212 include rules, models, and/or configuration data for the various algorithms or approaches employed by the intent engine 112 in determining how to translate or otherwise convert interaction history data 116 that is in a first type of format into a second type of format that is suitable for analysis by the intent model 118.

The network content data 221 may include various data employed by the services 106 in generating user interfaces 124, and/or other network pages. The network content data 221 may include hypertext markup language (HTML), extensible markup language (XML), cascading style sheets (CSS), images, text, audio, video, templates, and/or other data.

The client device 121 is representative of a plurality of client devices that can be coupled to the network 206. The client device 121 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 121 can include one or more displays 224, such as liquid crystal displays (LCDs), gas plasma-based flat panel displays, organic light emitting diode (OLED) displays, electrophoretic ink ("E-ink") displays, projectors, or other types of display devices. In some instances, the display 224 can be a component of the client device 121 or can be connected to the client device 121 through a wired or wireless connection.

The client device 121 can be configured to execute various applications such as a client application 227 or other applications. The client application 227 can be executed in a client device 121 to access network content served up by the computing environment 203 or other servers, thereby rendering a user interface 124 on the display 224. To this end, the client application 227 can include a browser, a dedicated application, or other executable, and the user interface 124 can include a network page, an application screen, or other user mechanism for obtaining user input. The client device 121 can be configured to execute applications beyond the client application 227 such as email applications, social networking applications, word processors, spreadsheets, or other applications.

Figure 3B:
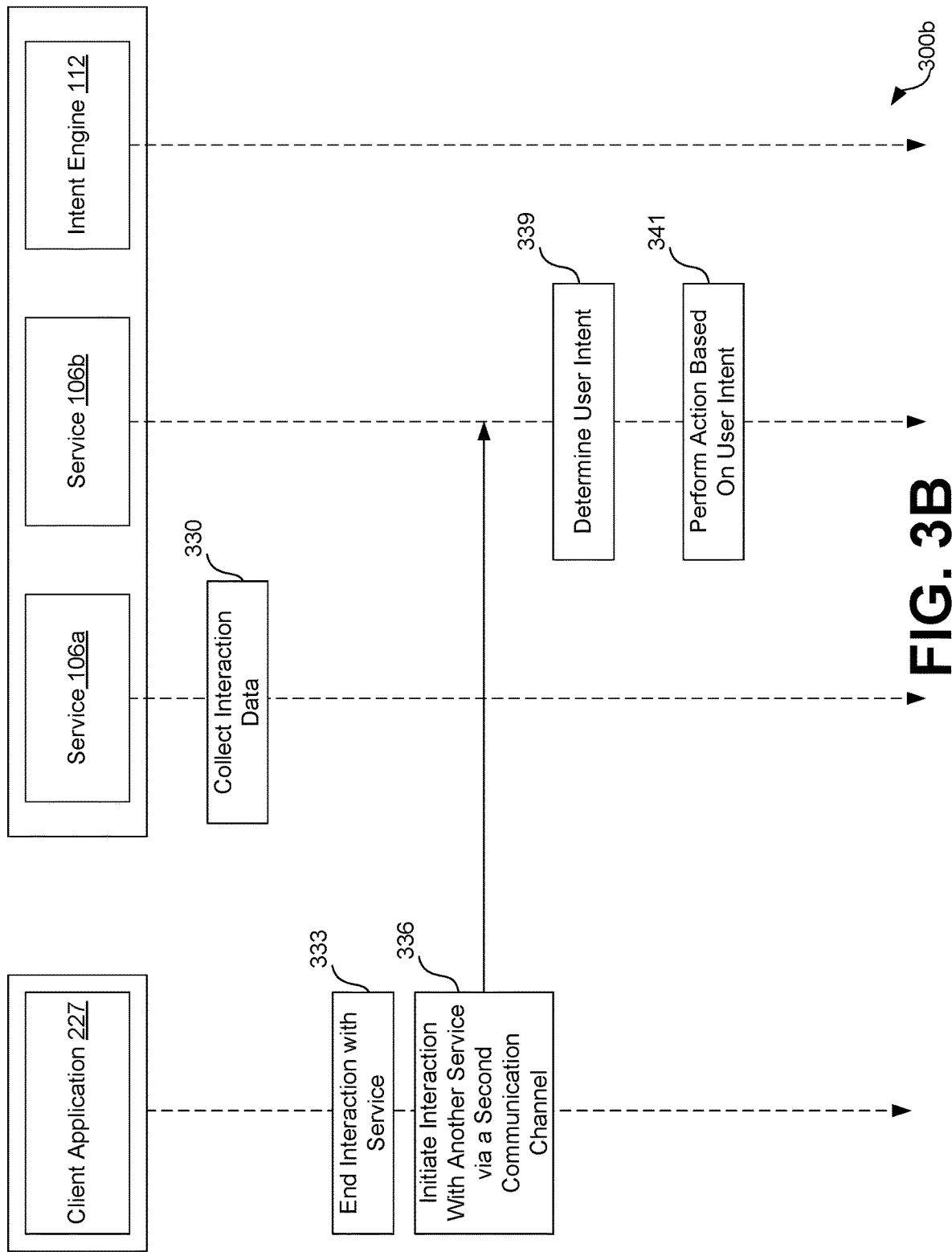

Next, a general description of the operation of the various components of the network environment 200 is provided with reference to FIGS. 3A, 3B, and 4. To begin, FIGS. 3A-3B illustrate a sequence diagram 300 (e.g., 300a, 300b) that provide an example of the operation of the components of the network environment 200. It is understood that the sequence diagram 300 of FIGS. 3A and 3B provides merely an example of the many different types of functional arrangements that can be employed to implement the operation of the depicted portion of the network environment 200. As an alternative, the sequence diagram 300 of FIGS. 3A-3B can be viewed as depicting an example of elements of a method implemented within the network environment 200. In particular, the sequence diagram 300 of FIGS. 3A-3B depicts the functionality associated with determining a user intent 109 based at least in part on user interaction history data 116 to provide a user with consistent messaging and interactions across multiple services 106, and communication channels, in accordance to various embodiments.

Beginning with block 303, a client application 227 can initiate an interactive session with a first service 106a via a first communication channel. Using the example of FIG. 1, the first service 106a can correspond to a web service that is configured to generated and produce content associated with the organization and/or user 103 or user account. It should be noted that designating the first service 106a as a web service is merely for illustrative purposes, and that the first service 106a being interacted with by the client application 227 can correspond to any sort of service 106 (e.g., chat service, email service, web service, text service, mail service, etc.) that can be used to address the needs of the organization and/or user 103 or user account.

In various examples, the client application 227 can include an identification of the user with a request to initiate an interactive session with the first service 106a. For example, the initiation of an interactive session can be in response to a user providing authenticating credentials that may be required to authenticate a user 103 and provide access to user data. In another examples, the client application 227 can provide other types of identifying data including a client device identifier, a payment account identifier, a user identifier, and/or other type of identifier.

At block 306, the first service 106a generates and sends a request to the intent engine 112 requesting for a user intent(s) 109 of the user 103. In various examples, the request to the intent engine 112 is sent in response to the client application 227 initiating the interactive session with the first service 106a. In various examples, the request can include a user identifier that the intent engine 112 can use to identify the user 103 associated with the request. In various examples, the request comprises an API request.

At block 309, the intent engine 112 collects the interaction history data 116 associated with the user 103. In various examples, the interaction history data 116 comprises interaction data corresponding to interactions by the user 103 or user account with one or more of the services 106 associated with the organization or enterprise associated with the computing environment 203. The interaction history data 116 can include data associated with interactions across multiple communication channels. In various examples, the intent engine 112 collects the interaction history data 116 by generating and sending requests to various data stores associated with the services 106. The data stores can include batch data stores and/or real-time data stores (e.g., low latency caches). In some examples, the data stores correspond to data store 215. In other examples, the data stores are separate from data store 215. In various examples, the requests can correspond to API requests that indicate a type of data to obtain for a given user 103. In some examples, the request can indicate limitations associated with the interaction data. For example, a limitation can include a maximum or minimum timeline of days associated with the interactions (e.g., up to 30 days), a maximum or minimum number of interaction records to include (e.g., up to 20 records), and/or other types of limitations. In response to the API requests, the intent engine 112 can be provided with the requested interaction history data 116 corresponding to user interactions with different services 106 across different communication channels.

At block 312, the intent engine 112 organizes the interaction history data 116. In various examples, the intent engine 112 organizes the interaction history data 116 according to a predefined schema that is acceptable for use an input to the intent model 118. For example, the predefined schema may define how the data is to be organized based at least in part on the type of data, a format of data, what is included in the data, and/or other factors. In some examples, the intent engine 112 can translate at least a portion of the interaction history data 116 from a first type of data format into a second type of data format. For example, the data format for a chat history may differ from the data format for a web interaction. As such, the intent engine 112 can apply the conversion rules 212 to format the chat history data and/or the web interaction data into a consistent format, as defined by the conversion rules 212.

At block 318, the intent engine 112 applies the organized interaction history data 116 as an input to the intent model 118. The intent model 118 comprises a deep neural network model that receives the organized interaction history data 116 associated with a user 103 as an input. The intent model 118 is trained to recognize user intent 109 based at least in part on observations of what other user with similar histories did next or what was done on their behalf. In various examples, the output of the intent model 118 includes one or more likely user intents 109 associated with the user 103.

At block 321, the intent engine 112 determines the user intent 109. In various examples, the output of the intent model 118 includes one or more likely user intents 109 associated with the user 103. As such, the intent engine 112 can determine the user intent 109 based at least in part on the output of the intent model 118. In some examples, the intent model 118 provides a ranked listing of likely intents 109, where the user intents 109 are ranked according to a likelihood that the predicted user intent 109 is an actual user intent. In some examples, the intent engine 112 determines the user intent 109 based at least in part on a highest ranked user intent included in the model output. In other examples, the user intent 109 includes the ranked listing of user intents 109.

At block 324, the intent engine 112 notifies the services 106, including the first service 106a of the user intent 109. For example, the intent engine 112 can respond to the API request of the first service 106a with the user intent 109. In other examples, the intent engine 112 can communicate with the other services 106 across a network to notify the other services 106 of the intent 109.

At block 327, the first service 106a performs an action based at least in part on the user intent 109. For example, the first service 106a can generate a user interface 124 that includes an indication of the determined intent 109. In some examples, the first service 106a may redirect the user 103 to a webpage that includes content addressing the user intent 109. For example, if the first service 106a determines that the user intent 109 is to make a payment, the first service 106a may generate a user interface 124 with content that can facilitate payment by the user 103. In some examples, the first service 106a can generate a pop-up box or other type of user interface component that asks the user a question based at least in part on the user intent. For example, the first service 106a can generate a pop-up box that includes one or more selectable components that upon selection can redirect the user to a given webpage. In this example, the selectable components can be based at least in part on the user intent(s) 109 identified by the intent engine 112.

In various examples, the service 106 can cause the user interface 124 and/or user interface components to be rendered on the client device 121. In one or more examples, the service 106 can transmit user interface code that is executable by the client device 121 to generate and render the user interface 124 on the client device 121. In other examples, service 106 can transmit the generated user interface 124 to the client device 121 for rendering.

At block 330, the first service 106a collects interaction history data 116 associated with the user interactions with the first service 106a. In the example of where the first service 106a corresponds to a web service, the collected data can correspond to interactions by the user 103 with the content provided by the web service. In various examples, the first service 106a collects the interaction history data 116 (e.g., clicks, hovers, time spent reviewing a webpage, payments, purchases, browsing history, etc.) and stores the collected data for both batch and real-time consumption. For example, the first service 106a can capture data associated with any interaction by the user with the first service 106a and store the interaction history data 116 in batch data stores and/or real-time data stores.

For batch consumption, the interaction history data 116 can be included in a streaming system of records captured by the first service 106a and stored in a batch data store. Similarly, for real-time consumption, the interaction history data 116 can be streamed in real-time and stored in a low-latency cache where it can be accessed in real-time or near real-time by other services 106 via application programming interface (API) calls. In some examples, the interaction history data 116 is stored in one or more data stores associated with a given service 106. In other examples, the interaction history data 116 is stored in one or more data stores associated with the organization or enterprise. In this example, the interaction history data 116 collected from multiple services 106 can be stored in one or more centralized data stores.

At block 333, the client application 227 can end the interactive session with the first service 106a. For example, if the first service 106a corresponds to a web service, the client application 227 can end the interactive session with the web service by terminating the connection with the web service. In the example of the first service 106a corresponding to a telephone service, the interactive session can be terminated by hanging up the phone, thereby disconnecting with the telephone service. In some examples, the client application 227 ends the interactive session because the user 103 has obtained the information and/or perform a task that he or she needed. In other examples, the interactive session is ended because the user 103 wants to use a different service 106 to obtain the information or perform the task that he or she needed.

At block 336, the client application 227 initiates an interactive session with a second service 106b via a second communication channel. Using the example of FIG. 1, the second service 106b can correspond to a chat service that is configured to engage with a chat conversation with the user 103 via the client application 227. It should be noted that the second service 106b as a chat service is merely for illustrative purposes, and that the second service 106a being interacted with by the client application 227 can correspond to any sort of service 106 that can be used to address the needs of the organization and/or user 103 or user account. In various examples, the client application 227 can include an identification of the user with a request to initiate an interactive session with the second service 106b.

At block 339, the second service 106b determines a user intent 109. In some examples, the user intent 109 is based at least in part on the user intent 109 that is provided by the intent engine 112 at block 324. In other examples, the second service 106b can request the user intent 109 from the intent engine 112, as discussed in block 306, and the intent engine 112 can determine the user intent 109 in accordance to the discussion of blocks 309-324, while considering the interaction history data 116 collected at block 330.

At block 341, the second service 106b performs an action based at least in part on the user intent 109. For example, the second service 106b can generate a user interface 124 that includes an indication of the determined intent 109. In the example of the second service 106b corresponding to a chat service, the second service 106b can generate a chat user interface 124b (FIG. 1) that includes an indication of the likely user intent 109. In other examples, the second service 106b may redirect the user 103 to a webpage that addresses the issue associated with the user intent 109. For example, if the second service 106b determines that the user intent 109 is to make a payment, the second service 106b may generate a user interface 124 with content that can facilitate payment by the user 103. In some examples, the second service 106 can generate a pop-up box or other type of user interface component that asks the user a question based at least in part on the user intent 109.

In various examples, the second service 106b can cause the user interface 124 and/or user interface components to be rendered on the client device 121. In one or more examples, the second service 106b can transmit user interface code that is executable by the client device 121 to generate and render the user interface 124 on the client device 121. In other examples, the second service 106b can transmit the generated user interface 124 to the client device 121 for rendering.

In examples where the second service 106b corresponds to a phone service, the second service 106b can notify a call representative 130 of the user intent 109 and the call representative can engage with the user 103 based at least in part on the determined user intent 109. Thereafter, this portion of the process proceeds to completion.

Turning now to FIG. 4, shown is a sequence diagram 400 that provides an example of the operation of the components of the network environment 200. It is understood that the sequence diagram 400 of FIG. 4 provides merely an example of the many different types of functional arrangements that can be employed to implement the operation of the depicted portion of the network environment 200. As an alternative, the sequence diagram 400 of FIG. 4 can be viewed as depicting an example of elements of a method implemented within the network environment 200. In particular, the sequence diagram 400 of FIG. 4 depicts the functionality associated with determining how to engage with a user 103 based at least in part on a user intent 109 in accordance to various embodiments of the present disclosure.

Beginning with block 403, the service 106 can identify a user 103 associated with a scheduled outreach. A scheduled outreach can correspond to an organization or enterprise reaching out to a user 103 with respect to a feature and/or need of the organization. In various examples, a scheduled outreach can include calling the user 103, sending direct mail to the user 103, sending one or more messages (e.g., email, text message, etc.) to the user 103, generating user interfaces 124 including content associated with the scheduled outreach to present to the user 103, and/or other types of outreach. In various examples, a user associated with a scheduled outreach can have certain characteristics that qualify a user for a given outreach. For example, a user 103 who has recently created a user account with the organization can be included in a scheduled outreach that welcomes new account holders. Similarly, a user 103 who has had a user account with the organization for a predefined period of time can be included in a scheduled outreach for loyal account holders. In other examples, a scheduled outreach can correspond to users 103 who are scheduled to receive their monthly payment account bills. In various examples, the user 103 associated with the scheduled outreach can be identified according to characteristics of the user 103 included in the user data 218 matching characteristics of the scheduled outreach. In other examples, the scheduled outreach can include a list of one or more users 103 associated with the scheduled outreach and the service 106 can identify the user based at least in part on the list of users 103.

At block 406, the service 106 generates and sends a request to the intent engine 112 requesting for a user intent(s) 109 of the user 103. In various examples, the request to the intent engine 112 is sent in response to the service 106 identifying the user 103 associated with a scheduled outreach. In various examples, the request can include a user identifier that the intent engine 112 can use to identify the user 103 associated with the request. In various examples, the request comprises an API request.

At block 409, the intent engine 112 collects the interaction history data 116 associated with the user 103. In various examples, the interaction history data 116 comprises interaction data corresponding to interactions by the user 103 or user account with one or more of the services 106 associated with the organization or enterprise associated with the computing environment 203. The interaction history data 116 can include data associated with interactions across multiple communication channels. In various examples, the intent engine 112 collects the interaction history data 116 by generating and sending requests to various data stores associated with the services 106. The data stores can include batch data stores and/or real-time data stores (e.g., low latency caches). In some examples, the data stores correspond to data store 215. In other examples, the data stores are separate data stores. In various examples, the requests can correspond to API requests that indicate a type of data to obtain for a given user 103. In some examples, the request can indicate limitations associated with the interaction data. For example, a limitation can include a maximum or minimum timeline of days associated with the interactions (e.g., up to 30 days), a maximum or minimum number of interaction records to include (e.g., up to 20 records), and/or other types of limitations. In response to the API requests, the intent engine 112 can be provided with the requested interaction history data 116 corresponding to user interactions with different services 106 across different communication channels.

At block 412, the intent engine 112 organizes the interaction history data 116. In various examples, the intent engine 112 organizes the interaction history data 116 according to a predefined schema that is acceptable for use an input to the intent model 118. For example, the predefined schema may define how the data is to be organized based at least in part on the type of data, a format of data, what is included in the data, and/or other factors. In some examples, the intent engine 112 can translate at least a portion of the interaction history data 116 from a first type of data format into a second type of data format. For example, the data format for a chat history may differ from the data format for a web interaction. As such, the intent engine 112 can apply the conversion rules 212 to format the chat history data and/or the web interaction data into a consistent format, as defined by the conversion rules 212.

At block 415 the intent engine 112 applies the organized interaction history data 116 as an input to the intent model 118. The intent model 118 comprises a deep neural network model that receives the organized interaction history data 116 associated with a user 103 as an input. The intent model 118 is trained to recognize user intent 109 based at least in part on observations of what other user with similar histories did next or what was done on their behalf. In various examples, the output of the intent model 118 includes one or more likely user intents 109 associated with the user 103.

At block 418, the intent engine 112 determines the user intent 109. In various examples, the output of the intent model 118 includes one or more likely user intents 109 associated with the user 103. As such, the intent engine 112 can determine the user intent 109 based at least in part on the output of the intent model 118. In some examples, the intent model 118 provides a ranked listing of likely intents 109, where the user intents 109 are ranked according to a likelihood that the predicted user intent 109 is an actual user intent. In some examples, the intent engine 112 determines the user intent 109 based at least in part on a highest ranked user intent included in the model output. In other examples, the user intent 109 includes the ranked listing of user intents 109.

At block 421, the intent engine 112 notifies the services 106 in the organization, including the requesting service 106 of the user intent 109. For example, the intent engine 112 can respond to the API request of the requesting service 106 with the user intent 109. In other examples, the intent engine 112 can communicate with the other services 106 across a network to notify the other services 106 of the intent 109.

At block 424, the service 106 receives the user intent 109 and modifies the scheduled outreach based at least in part on the user intent 109. Modifying the scheduled outreach can include modifying the content associated with the scheduled outreach, modifying the date or time of the scheduled outreach, removing a message associated with the scheduled outreach, adding a message associated with the scheduled outreach, and/or other type of modification. For example, if the scheduled outreach is related to a welcoming outreach that welcomes new account holders to the organization and includes one or more messages that describe tasks that should be completed by the user 103, and the user intent 109 indicates that the user has already completed at least one of the tasks, the scheduled outreach can be modified to remove the tasks that have already been completed by the user.

At block 427, the service 106 performs the modified scheduled outreach. In the example of the scheduled outreach comprising sending messages to the user 103, the service 106 can generate the messages associated with the modified scheduled outreach and transmit the messages to the client application 227. If the scheduled outreach corresponds to content provided via one or more user interfaces 124, the service 106 can generate the one or more user interfaces 124 based at least in part on the modified scheduled outreach. The service 106 can then cause the user interface(s) 124 to be rendered on the client device 121. In one or more examples, the service 106 can transmit user interface code that is executable by the client device 121 to generate and render the user interface(s) 124 on the client device 121. In other examples, service 106 can transmit the generated user interface(s) 124 to the client device 121 for rendering. Thereafter, this portion of the process proceeds to completion.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
    a computing device comprising a processor and a memory; and
    machine-readable instructions stored in the memory that, when executed by the processor, cause the computing device to at least:
        receive an intent request from a first service of a plurality of services, the intent request requesting a user intent associated with a user interacting with the first service;
        collect interaction data from a plurality of services, the interaction data being associated with a plurality of user interactions with the plurality of services over a plurality of communication channels;
        translate a first portion of the interaction data from a first format to a second format to comply with a predefined schema, the first format being associated with a first communication channel of the plurality of communication channels, the second format being required for a trained intent model;
        translate a second portion of the interaction data from a third format to the second format to comply with the predefined schema, the third format being associated a second communication channel of the plurality of communication channels;
        organize the interaction data according to the predefined schema;
        apply the interaction data that is organized according to the predefined schema as an input in to the trained intent model;
        determine the user intent of the user based at least in part on an output of the trained intent model; and
        notify the plurality of services of the user intent, wherein subsequent user interactions with any one of the plurality of services are based at least in part on the user intent.

2. The system of claim 1, wherein a first service of the plurality of services corresponds to a chat service and a second service of the plurality of services corresponds to a web service.

3. The system of claim 1, wherein the interaction data comprises a plurality of interaction records, individual interaction records corresponding to individual user interactions of the plurality of user interactions.

4. The system of claim 3, wherein the machine-readable instructions further cause the computing device to at least:
determine that an interaction records format of a given interaction record of the plurality of interaction records fails to conform with the predefined schema; and
translate data of the given interaction record into an acceptable format of the predefined schema.

5. The system of claim 1, wherein collecting the interaction data comprises:
sending a respective application programming interface (API) request to individual services of the plurality of services; and
receiving a respective subset of the interaction data from the individual services of the plurality of services.

6. The system of claim 1, wherein at least a portion of the interaction data comprises real-time data.

7. The system of claim 1, wherein the interaction data comprises at least one of browsing history, call history, payment history, transaction history, or chat history.

8. A method, comprising:
identifying a user associated with a scheduled outreach, the scheduled outreach comprising sending a plurality of messages to the user;
translating a first portion a collection of interaction data associated with the user from a first format to a second format to comply with a predefined schema, the first format being associated with a first type of interaction over a first communication channel of a plurality of communication channels, the second format being required for a trained intent model;
translating a second portion of the collection of interaction data associated with the user from a third format to the second format to comply with the predefined schema, the third format being associated with a second type of interaction over a second communication channel of the plurality of communication channels;
organizing the collection of interaction data associated with the user according to the predefined schema;
determining a user intent based at least in part on an output of the trained intent model, an input of the trained intent model is based at least in part on the collection of interaction data associated with the user and organized according to the predefined schema;
modifying the scheduled outreach for the user based at least in part on the user intent; and
initiating the scheduled outreach by sending the plurality of messages associated with the modified scheduled outreach to a client device associated with the user.

9. The method of claim 8, wherein the trained intent model is trained according to interaction history data associated with a plurality of interactions by a plurality of users with a plurality of services by the plurality of users over the plurality of communication channels.

10. The method of claim 9, wherein the interaction data comprises at least one of browsing history data, call history data, payment history data, transaction history data, or chat history data.

11. The method of claim 8, wherein the output of the trained intent model includes an identification of a plurality of user intents, the user intent being selected from the plurality of user intents.

12. The method of claim 8, wherein the collection of interaction data is associated with a plurality of user interactions with a plurality of services by the user via the plurality of communication channels.

13. The method of claim 8, wherein modifying the scheduled outreach comprises removing at least one message from the plurality of messages based at least in part on the user intent.

14. The method of claim 8, further comprising generating the plurality of messages, wherein content included in at least one of the plurality of messages is based at least in part on the user intent.

15. A non-transitory, computer-readable medium, comprising machine-readable instructions that, when executed by a processor of a computing device, cause the computing device to at least:
receive a request to engage in an interaction session from a client device;
determine a user intent based at least in part on an output of an intent model, the output of intent model being determined according to an input including user interaction data organized according to a predefined schema and translated from to a second format that is required for the intent model, a first portion of the user interaction data being translated from a first format associated with a first type of communication channel of a plurality of communication channels to the second format, a second portion of the user interaction data being translated from a third format associated with a second type of communication channel of a plurality of communication channels to the second format, and the user interaction data corresponding to a plurality of user interactions with a plurality of services by a user associated with the client device via the plurality of communication channels;
generate a user interface associated with the interaction session, the user interface including an indication of knowledge of the user intent; and
cause the user interface to be rendered on the client device.

16. The non-transitory, computer-readable medium of claim 15, wherein the user interaction data comprises at least one of browsing history data, call history data, payment history data, transaction history data, or chat history data.

17. The non-transitory, computer-readable medium of claim 15, wherein the machine-readable instructions, when executed by the processor, further cause the computing device to at least collect real-time interaction data based at least in part on the interaction session, the real-time interaction data being included in the input of the intent model.

18. The non-transitory, computer-readable medium of claim 15, wherein the user interface comprises a chat user interface.

19. The non-transitory, computer-readable medium of claim 15, wherein determining the user intent comprises sending an application programming interface (API) request to an intent engine, the API request triggering a collection and an organization of the user interaction data associated with a user of the client device.

20. The non-transitory, computer-readable medium of claim 15, wherein the plurality of services comprises at least one of: a web service, a chat service, a phone service, an email service, or a text service.

* * * * *